(12) United States Patent
Kayaarasi

(10) Patent No.: US 12,187,155 B2
(45) Date of Patent: Jan. 7, 2025

(54) BATTERY SWAP STATION

(71) Applicant: T.C. PIRI REIS UNIVERSITESI, Istanbul (TR)

(72) Inventor: Tolunay Kayaarasi, Istanbul (TR)

(73) Assignee: T.C. PIRI REIS UNIVERSITESI, Istanbul (TR)

(*) Notice: Subject to any disclaimer, the term of this patent is extended or adjusted under 35 U.S.C. 154(b) by 543 days.

(21) Appl. No.: 17/640,348

(22) PCT Filed: Nov. 19, 2019

(86) PCT No.: PCT/TR2019/050975
§ 371 (c)(1),
(2) Date: Mar. 4, 2022

(87) PCT Pub. No.: WO2021/061060
PCT Pub. Date: Apr. 1, 2021

(65) Prior Publication Data
US 2022/0332211 A1    Oct. 20, 2022

(30) Foreign Application Priority Data
Sep. 27, 2019  (TR) .................................. 2019/14788

(51) Int. Cl.
*B60L 53/80* (2019.01)
*B60K 1/04* (2019.01)
(Continued)

(52) U.S. Cl.
CPC ............... *B60L 53/80* (2019.02); *B60K 1/04* (2013.01); *H02J 7/007* (2013.01); *H02J 7/35* (2013.01);
(Continued)

(58) Field of Classification Search
CPC ... B60L 53/80; B60K 1/04; B60K 2001/0455; H02J 7/007; H02J 7/35; H02J 2300/22
(Continued)

(56) References Cited

U.S. PATENT DOCUMENTS 4,342,533 A * 8/1982 Hane ....................... B60L 50/66
414/400
4,450,400 A * 5/1984 Gwyn ..................... B60L 53/80
414/373
(Continued)

FOREIGN PATENT DOCUMENTS

CN        217944956 U  * 12/2022  .............. B60L 53/80
CN        113492714 B  *  8/2024  .............. B60L 53/30
(Continued)

*Primary Examiner* — Suresh Memula
(74) *Attorney, Agent, or Firm* — Bayramoglu Law Offices LLC

(57) ABSTRACT

Swap stations for switching power batteries of electric vehicles are provided. The swap stations include: an identification and battery handling unit performing vehicle acceptance, vehicle identification, cap opening and battery identification operations, a transport and control unit sending continue process command for a certain station, a full battery conveyor belt carrying a full battery from a full battery storage to a vehicle, an empty battery conveyor belt carrying an empty battery from an empty battery storage to the vehicle, the full battery storage, the empty battery storage, an electrical panel ensuring a controlled and safe operation of an electrical installation, a main PLC ensuring controlling of all operations, a battery replacement automation unit providing disassembly and movement operations, a transmission line unit, a battery replacement belt and automation unit, located within the transport and control unit, and a battery charge controller controlling a charge status of batteries.

7 Claims, 3 Drawing Sheets

(51) Int. Cl.
*H02J 7/00* (2006.01)
*H02J 7/35* (2006.01)

(52) U.S. Cl.
CPC ... *B60K 2001/0455* (2013.01); *H02J 2300/22* (2020.01)

(58) Field of Classification Search
USPC .......................................................... 320/109
See application file for complete search history.

(56) References Cited

U.S. PATENT DOCUMENTS

| | | | | |
|---|---|---|---|---|
| 4,983,903 | A * | 1/1991 | Bae ...................... | H01M 10/42 104/34 |
| 5,549,443 | A * | 8/1996 | Hammerslag ............ | B60K 1/04 180/68.5 |
| 5,711,648 | A * | 1/1998 | Hammerslag ........... | B60L 50/66 180/68.5 |
| 5,927,938 | A | 7/1999 | Hammerslag | |
| 5,951,229 | A * | 9/1999 | Hammerslag ............ | B60L 3/12 180/68.5 |
| 6,094,028 | A | 7/2000 | Gu et al. | |
| 8,875,826 | B2 * | 11/2014 | Franzen .................. | B60L 50/66 180/68.5 |
| 10,345,843 | B2 * | 7/2019 | Luke ...................... | G06Q 30/0267 |
| 2007/0113921 | A1 * | 5/2007 | Capizzo ................. | B60L 53/80 141/231 |
| 2010/0141206 | A1 * | 6/2010 | Agassi ................ | H01M 50/204 320/109 |
| 2012/0316671 | A1 * | 12/2012 | Hammerslag ........... | B60L 53/65 700/230 |
| 2021/0170895 | A1 * | 6/2021 | Austrheim ........... | B65G 1/0464 |
| 2022/0203854 | A1 * | 6/2022 | Yu ............................ | B60L 53/30 |
| 2023/0150392 | A1 * | 5/2023 | Zhang ...................... | B60K 1/04 320/104 |
| 2023/0173938 | A1 * | 6/2023 | Zhao ...................... | H02J 7/0013 320/109 |
| 2023/0191930 | A1 * | 6/2023 | Zhao ...................... | B60L 58/26 320/109 |
| 2023/0219454 | A1 * | 7/2023 | Wang ................... | G06Q 30/018 320/109 |
| 2023/0226944 | A1 * | 7/2023 | Zhang ..................... | B60L 53/80 320/109 |
| 2023/0278455 | A1 * | 9/2023 | Saliga ..................... | B60L 53/65 320/109 |
| 2023/0311701 | A1 * | 10/2023 | Wang ..................... | B60L 53/80 320/109 |

FOREIGN PATENT DOCUMENTS

| | | | |
|---|---|---|---|
| EP | 2231447 A1 | 9/2010 | |
| EP | 3705360 A1 * | 9/2020 | ............. B60L 53/80 |
| WO | WO-9821132 A1 * | 5/1998 | ............... B60K 1/04 |
| WO | 2009092343 A1 | 7/2009 | |
| WO | 2010033883 A1 | 3/2010 | |
| WO | WO-2010070642 A1 * | 6/2010 | ................ B60S 5/06 |
| WO | 2013144948 A1 | 10/2013 | |
| WO | 2019085308 A1 | 5/2019 | |
| WO | WO-2019114546 A1 * | 6/2019 | ............... B60K 1/04 |
| WO | WO-2020033474 A1 * | 2/2020 | |

* cited by examiner

BATTERY SWAP STATION

CROSS REFERENCE TO THE RELATED APPLICATIONS

This application is the national stage entry of International Application No. PCT/TR2019/050975, filed on Nov. 19, 2019, which is based upon and claims priority to Turkish Patent Application No. 2019/14788 filed on Sep. 27, 2019, the entire contents of which are incorporated herein by reference.

TECHNICAL FIELD

The invention relates to swap stations for switching the power batteries (batteries) of electric vehicles.

BACKGROUND

The component that stores electrical energy by converting it into chemical energy and supplies it where necessary by converting such chemical energy into electrical energy is called battery (accumulator, battery, cell). All energy required for electric vehicles is supplied from batteries. The charging process of these batteries can take 2-3 hours.

The range of electric vehicles range has increased to 400 kilometers. Availability of limited number of charging stations together with long charging periods, prevent electric vehicles to be preferred. The fastest battery charging stations in the prior art can charge the batteries in 30-40 minutes. In these quick charging stations mentioned, the life span of the batteries decreases during quick charging.

A sliding door system for battery swap stations is mentioned in European Patent document No. EP2231447 available in prior art. For said sliding door system, the electric vehicle comprises a battery pack which can be replaced at a battery swap station. A battery which is at least partially exhausted in the battery swap station is replaced by a battery which is at least partially charged. A battery housing is configured to be located on an underside of the electric vehicle. The battery housing includes a bezel that defines a slot. The slot is configured such that the battery pack is at least partially installed. The battery housing comprises at least one latch that can be pivoted about an axis substantially parallel to a plane formed by the underside of the vehicle. This latch is configured to lift the battery pack and keep it in the slot. How the battery is removed and transported from the vehicles is mentioned in this system. No battery and/or vehicle identification system exist.

SUMMARY

The purpose of the invention is to provide automatic, fast and reliable replacement of electric vehicle batteries.

Another purpose of the invention is to obtain a station wherein the replaceable electric vehicle batteries can be charged by using renewable energy in addition to mains power.

Another purpose of the invention is to obtain a battery swap station in which fuel is saved.

Another purpose of the invention is to obtain a battery swap station in which the machine efficiency is increased.

Another purpose of the invention is to obtain a battery swap station, which allows practical replacement of vehicle batteries.

Another purpose of the invention is to obtain a modular battery swap station.

The battery swap station developed to realize the mentioned purposes is composed of the identification and battery handling unit (2), reading, transport and control unit (4), full battery conveyor belt (5a), empty battery conveyor belt (5b), full battery s (6a), empty battery storage (6b), electrical panel (7), main PLC (8), battery swap automation unit (9), battery transmission line unit (10), battery swap belt and automation unit (11), battery charge controller (12), solar panel (13) the solar panel unit (14), the charge distribution unit (15), the solar panel battery (16) and the solar battery panel unit (17).

DETAILED DESCRIPTION OF THE EMBODIMENTS

Figure 1:
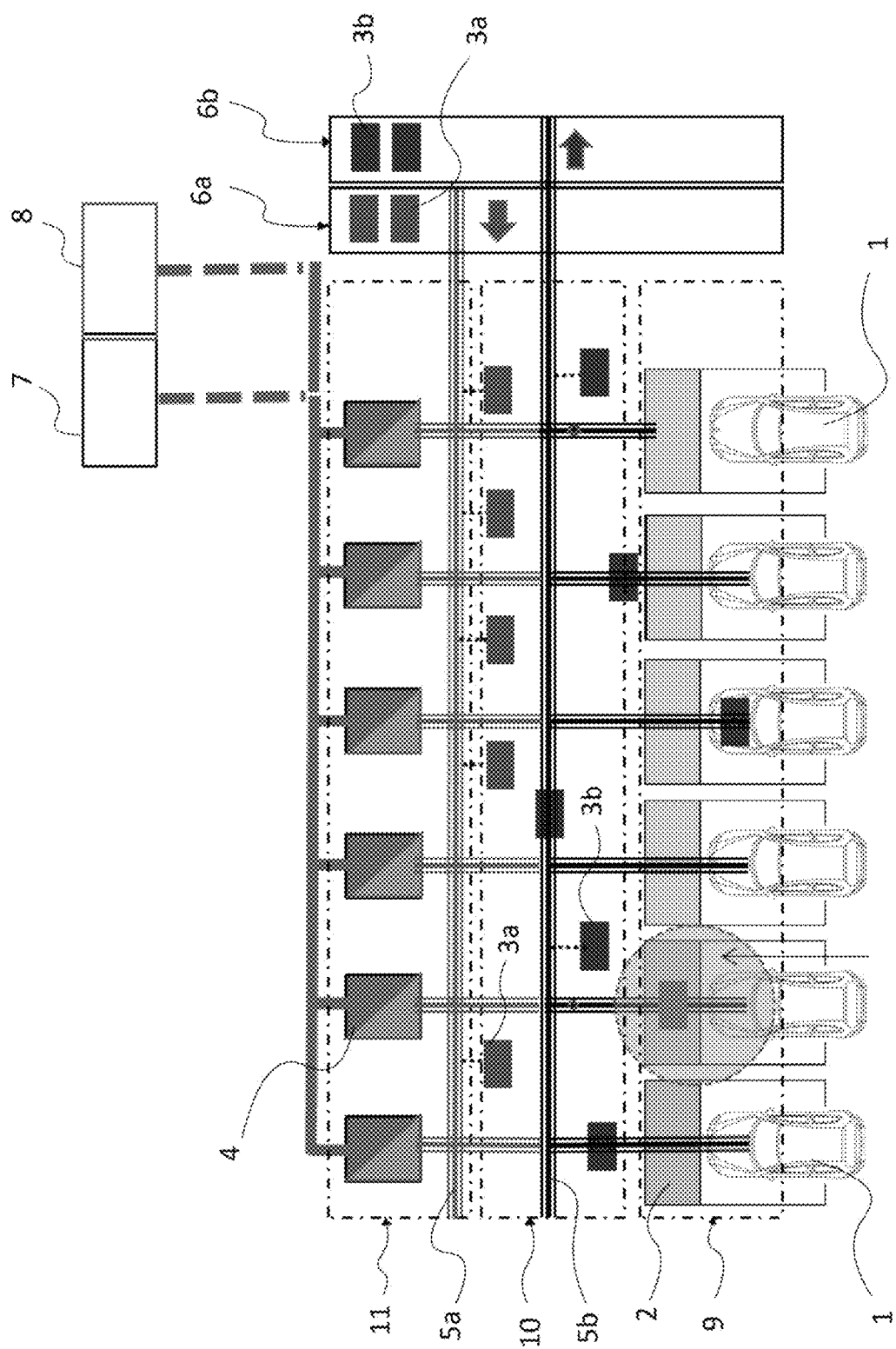
FIG. 1 is the schematic view of the battery swap station.
Figure 2:
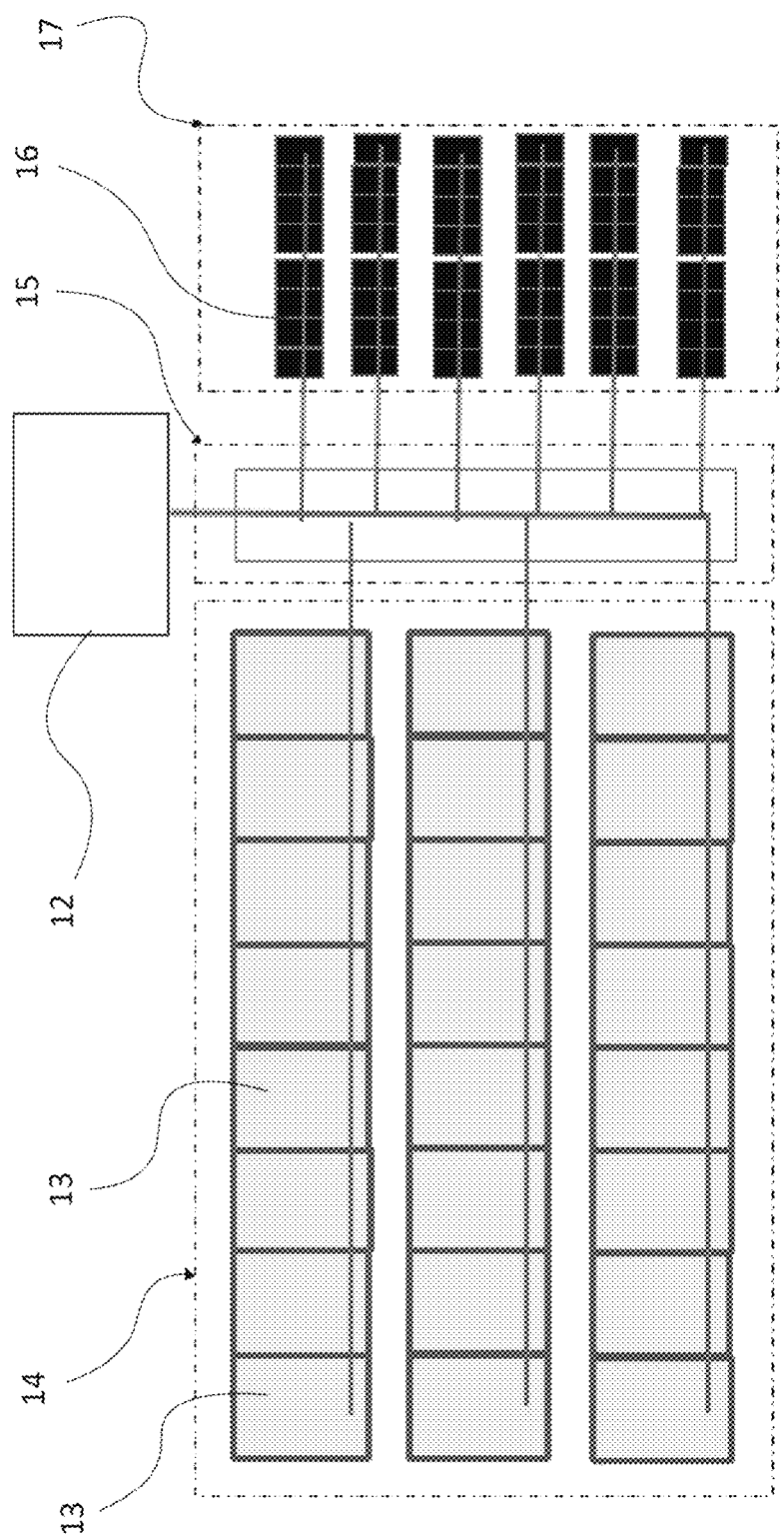
FIG. 2 is a schematic view of the charging and storage station of the batteries.
Figure 3:
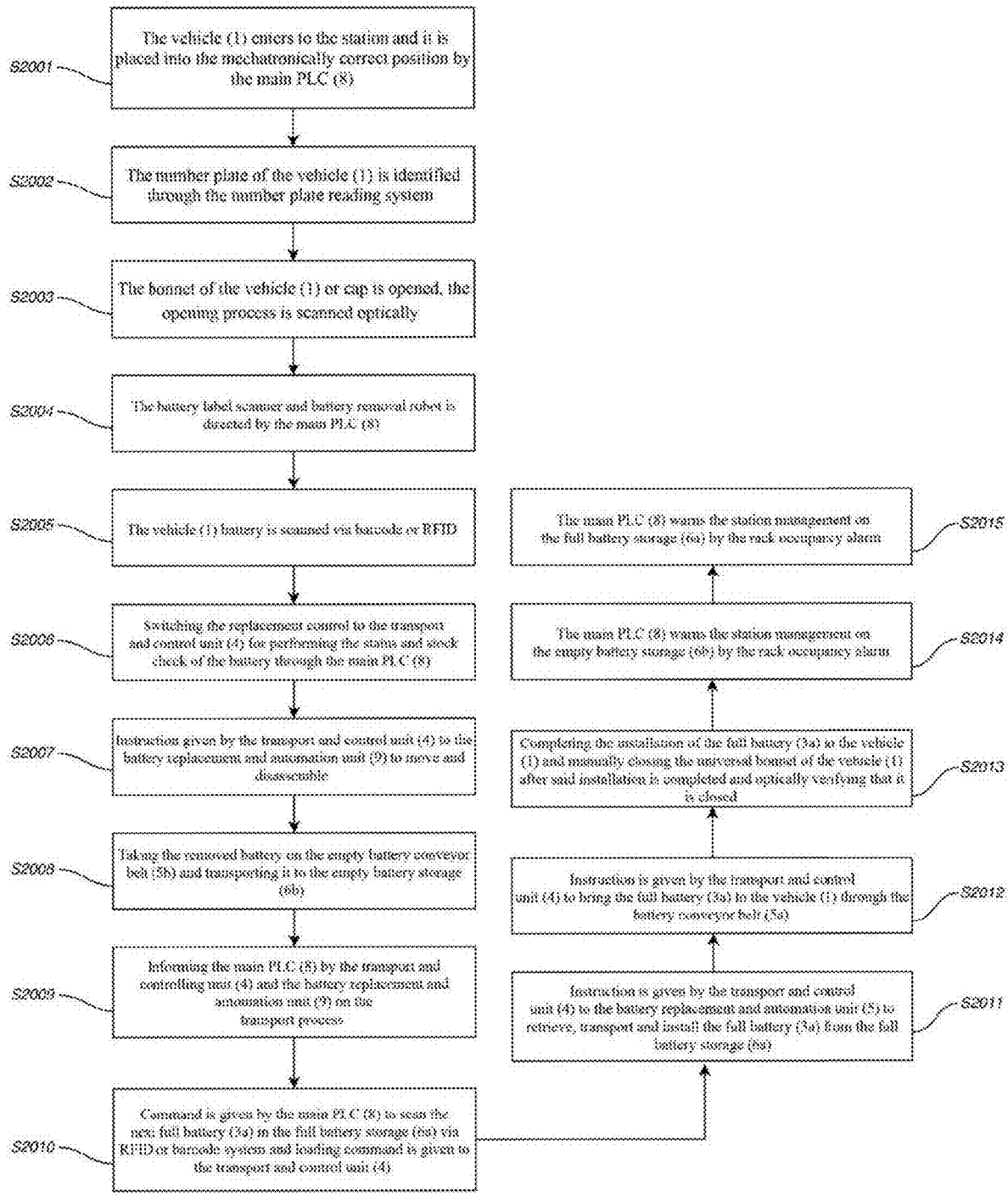
FIG. 3 is the detailed flowchart of the battery swap station.
Numbers and names of main parts mentioned in the figures are given below.
(1) Vehicle
(2) Identification and battery handling unit
(3a) Full battery
(3b) Empty battery
(4) Transport and control unit
(5a) Full battery conveyor belt
(5b) Empty battery conveyor belt
(6a) Full battery storage
(6b) Empty battery storage
(7) Electrical panel
(8) Main PLC
(9) Battery replacement and automation unit
(10) Battery transmission line unit
(11) Battery swap belt and automation unit
(12) Battery charge control unit
(13) Solar panel
(14) Solar Panel Unit
(15) Charging distribution unit
(16) Solar panel battery
(17) Solar panel battery unit

The invention relates to swap stations for switching the power batteries (batteries) of electric vehicles (1). The battery swap station subject to the invention is composed of the identification and battery handling unit (2), transport and control unit (4), full battery conveyor belt (5a), empty battery conveyor belt (5b), full battery storage (6a), empty battery storage (6b), electrical panel (7), main PLC (8), battery replacement and automation unit (9), battery transmission line unit (10), battery swap belt and automation unit (11), battery charge controller (12), solar panel (13) the solar panel unit (14), the charge distribution unit (15), the solar panel battery (16) and the solar battery panel unit (17). As an alternative to the solar panel unit (14) used in the swap station under the present invention, wind energy, biomass energy, hydroelectric energy, wave energy and etc. renewable energy sources can be used.

The electrical panel (7) provides necessary electrical energy from renewable energy sources in order to ensure continuous operation of the system. When renewable energy sources are insufficient and in case of interruption in the network. it draws necessary electrical energy from the grid.

In the battery swap station under the invention, a compensation unit panel is provided. The compensation unit is the unit on which the gauges, contactors, electrical fuses and capacitors are located to correct the cos Q of the operation. The compensation unit ensures efficient and controlled use of electrical energy.

The main PLC (8) unit (Programmable Logic Controller) is the unit where all other mechatronic commands and controlling of other units are performed. The algorithm used in the main PLC (8) is made by the designer. All data processed by this unit are recorded in a black box in accordance with international norms due to administrative, financial, legal and technical needs.

Identification and battery handling unit (2) performs vehicle (1) acceptance, vehicle (1) identification, bonnet opening and battery identification operations. Once the vehicle (1) the battery of which will be changed is left in the station through the vehicle (1) acceptance process, it is brought to the area related to mechatronic methods for battery replacement. In order to keep administratively, legally, financially and technically necessary records during the vehicle (1) identification process, the vehicle (1) that will be subject to battery replacement process, is identified via RFID, optical, Automatic Passage System or Quick Toll System. Standard frame or battery cap manufactured according to international norms, is opened in suitable dimensions via the bonnet or cap opening process.

The transport and control unit (4) sends continue process command for a certain station, which is detected by the main PLC (8) and once vehicle (1) acceptance, vehicle (1) identification and bonnet opening procedures are approved.

With the battery identification process, the battery or cell of the vehicle (1) arriving at the station is identified. Identification is performed with barcode and RFID systems. The identification unit must be positioned precisely on the battery by means of an optical or position sensor in order to carry out the identification process in a proper way.

The battery of the vehicle (1) is removed from its place during the battery removal process and removed, i.e. empty batteries (3b) are delivered to the conveyor line through the dismantling conveyor line.

The transport process of the batteries, whose dismantling process is completed in the dismantling unit, is realized with the battery transmission line unit (10). Said battery transmission line unit (10) operates as a conveyor. The battery transmission line unit (10) guides the battery removal unit. The battery removal unit is placed on the conveyor on the transmission line according to the vehicle (1) position reference points and the number of stations. The direction of the battery removal unit is adjusted by the main PLC (8) according to whether the vehicles (1) enter the stations continuously.

Battery installation sequence is composed of following process steps:

Reading the identification label of the charged (gull) battery (3a) to be installed,
Taking the battery identified from the shelf,
Conveying the vehicle (1) to relevant section through the conveyor system and positioning it according to the reference points,
Inserting the full battery (3a) into the vehicle (1),
Closing the respective cap after the insertion process and verification of the closing process.

In the battery installation process, the conveyor runs as a system. The battery installation unit is placed on the conveyor according to the vehicle (1) position reference points and the number of stations. The direction of the installation procedure is adjusted by the main PLC (8) according to whether the vehicles (1) enter the stations continuously.

Unless the main PLC (8) in the battery swap station under the present invention lights up the "entry" signal, the vehicle (1) is not taken to the station for battery replacement. Again, unless such main PLC (8) lights up the "green light", the bonnet of the vehicle (1), which is subject to battery replacement process, cannot be closed manually. Unless the main PLC (8) gives "exit" signal, the vehicle (1) cannot leave the station.

Commanding and controlling signaling between all said units and processes are provided by software which is in compliance with the required algorithm. All operations including commands, controls, warning and alarms (all kinds of smoke, fire, flare, flame, etc.) are controlled by such algorithm.

The invention relates to an operation method for the swap stations for switching the power batteries (batteries) of electric vehicles (1), which is composed of following process steps:

The vehicle (1) enters to the station and it is placed into the mechatronically correct position by the main PLC (8) (S2001),
The number plate of the vehicle (1) is identified through the number plate reading system (S2002),
The bonnet of the vehicle (1) or cap is opened, the opening process is scanned optically (S2003),
The battery label scanner and battery removal robot is directed by the main PLC (8) (S2004),
The vehicle (1) battery is scanned via barcode or RFID (S2005),
Switching the replacement control to the transport and control unit (4) for performing the status and stock check of the battery through the main PLC (8) (S2006),
Instruction given by the transport and control unit (4) to the battery replacement and automation unit (9) to move and disassemble (S2007),
Taking the removed battery on the empty battery conveyor belt (5b) and transporting it to the empty battery storage (6b) (S2008),
Informing the main PLC (8) by the transport and controlling unit (4) and the battery replacement and automation unit (9) on the transport process (S2009),
Command is given by the main PLC (8) to scan the next full battery (3a) in the full battery storage (6a) via RFID or barcode system and loading command is given to the transport and control unit (4) (S2010),
Instruction is given by the transport and control unit (4) to the battery replacement and automation unit (5) to retrieve, transport and install the full battery (3a) from the full battery storage (6a) (S2011),
Instruction is given by the transport and control unit (4) to bring the full battery (3a) to the vehicle (1) through the battery conveyor belt (5a) (S2012),
Completing the installation of the full battery (3a) to the vehicle (1) and manually closing the universal bonnet of the vehicle (1) after said installation is completed and optically verifying that it is closed (S2013),
The main PLC (8) warns the station management on the empty battery storage (6b) by the rack occupancy alarm (S2014),
The main PLC (8) warns the station management on the full battery storage (6a) by the rack occupancy alarm (S2015), In the swap station according to the invention, each process is recorded. The transactions are recorded in accordance with international norms.

The empty batteries (3b) in the empty battery storage (6b) at the battery swap station are charged by using solar panels (13). The unit accommodating all solar panels (13) is called the solar panel unit (14). The energy generated by the solar panels (13) is stored in the solar panel batteries (16). The unit accommodating all solar panel batteries (16) is called the solar panel battery unit (17). The solar panel unit (14) is provided with a charge distribution unit (15) which ensures that the generated energy is delivered to the battery swap station in a smooth and controlled manner.

The battery swap station draws the energy required for its operation primarily from the solar panel unit (14). In case of insufficient energy, it can automatically draw electricity from the grid. In alternative embodiments of the invention, wind energy, bioenergy, and etc. renewable energy systems in addition to solar energy can be used integrated into the battery station.

What is claimed is:

1. An operating method for swap stations for switching power batteries of electric vehicles, comprising the following steps of:
    S2001, when a vehicle enters a swap station, placing the vehicle into a mechatronically correct position by a main programmable logic controller (PLC),
    S2002, identifying a number plate of the vehicle through a number plate reading system,
    S2003, opening a bonnet or a cap of the vehicle, wherein the step of opening is scanned optically,
    S2004, directing a battery label scanner and a battery removal robot by the main PLC,
    S2005, scanning a vehicle battery via a barcode or a radio frequency identification (RFID),
    S2006, switching a replacement control to a transport and control unit for performing a status and stock check of the vehicle battery through the main PLC and recording data sent,
    S2007, giving instruction by the transport and control unit to a battery replacement and automation unit to move and disassemble,
    S2008, taking a removed battery on an empty battery conveyor belt and transporting the removed battery to an empty battery storage,
    S2009, informing the main PLC by the transport and controlling unit and the battery replacement and automation unit on a transport process,
    S2010, giving a command by the main PLC to scan a full battery in a full battery storage via an RFID system or a barcode system and giving a loading command to the transport and control unit,
    S2011, giving a first instruction by the transport and control unit to the battery replacement and automation unit to retrieve, transport and install the full battery from the full battery storage,
    S2012, giving a second instruction by the transport and control unit to bring the full battery to the vehicle through a full battery conveyor belt,
    S2013, completing an installation of the full battery to the vehicle and manually closing a universal bonnet of the vehicle after the installation is completed and optically verifying the universal bonnet of the vehicle is closed,
    S2014, the main PLC warns a station management on the empty battery storage by a rack occupancy alarm, and
    S2015, the main PLC warns the station management on the full battery storage by the rack occupancy alarm.

2. The operation method according to claim 1, wherein the step S2013 comprises following subprocess steps of:
    reading an identification label of the full battery to be installed,
    taking the full battery identified from a shelf,
    conveying the vehicle to a relevant section through a conveyor system and positioning the vehicle according to reference points,
    inserting the full battery into the vehicle, and
    closing a respective cap after an insertion process and verification of a closing process.

3. A battery swap station for switching power batteries of electric vehicles, comprising:
    an identification and battery handling unit wherein the identification and battery handling unit performs vehicle acceptance, vehicle identification, cap opening and battery identification operations,
    a transport and control unit for sending a continue process command for a certain station, wherein the continue process command is detected by a main PLC and once procedures of the vehicle acceptance, the vehicle identification and the cap opening are approved,
    a full battery conveyor belt for carrying a full battery from a full battery storage to a vehicle,
    an empty battery conveyor belt for carrying an empty battery from an empty battery storage to the vehicle,
    the full battery storage, wherein full batteries are stored in the full battery storage,
    the empty battery storage, wherein empty batteries are stored in the empty battery storage for charging,
    an electrical panel for ensuring a controlled and safe operation of an electrical installation,
    The main PLC configured for ensuring controlling of all operations,
    a battery replacement automation unit for providing disassembly and movement operations,
    a transmission line unit, wherein transport of the empty batteries removed from the vehicle and the full batteries to be installed in the vehicle is carried out in the transmission line unit,
    a battery replacement belt and automation unit, wherein the battery replacement belt and automation unit is located within the transport and control unit, and
    a battery charge controller for controlling a charge status of the power batteries.

4. The battery swap station according to claim 3, comprising:
    a solar panel unit comprising at least one solar panel and the at least one solar panel providing energy required for a system,
    a charge distribution unit, wherein the charge distribution unit provides the energy obtained from the solar panel unit to be transferred to the battery swap station in a regular and controlled manner,
    a solar panel battery, wherein, in the solar panel battery, the energy generated by the at least one solar panel is stored and a solar panel battery unit accommodating the at least one solar panel.

5. The battery swap station according to claim 4, comprising a compensation unit ensuring an efficient and controlled use of an electrical energy from a grid and/or from the solar panel battery unit.

6. The battery swap station according to claim 3, comprising a radio frequency identification (RFID) system, an optical system, an Automatic Passage System (APS) and/or a Quick Toll System (OTS) enabling keeping administratively, legally, financially and technically necessary records.

7. The battery swap station according to claim 3, comprising an optical sensor and/or a position sensor, wherein the optical sensor and/or the position sensor is positioned precisely on a battery to carry out an identification process.

\* \* \* \* \*